United States Patent [19]
Wells et al.

[11] Patent Number: 5,754,817
[45] Date of Patent: May 19, 1998

[54] EXECUTION IN PLACE OF A FILE STORED NON-CONTIGUOUSLY IN A NON-VOLATILE MEMORY

[75] Inventors: Steven E. Wells, Citrus Heights; Markus A. Levy, El Dorado Hills, both of Calif.

[73] Assignee: Intel Corporation, Santa Clara, Calif.

[21] Appl. No.: 797,994

[22] Filed: Feb. 12, 1997

Related U.S. Application Data

[63] Continuation of Ser. No. 315,228, Sep. 29, 1994, abandoned.
[51] Int. Cl.$^6$ ................................................ G06G 12/10
[52] U.S. Cl. ........................ 395/413; 395/430; 395/442
[58] Field of Search ................................. 395/412, 413, 395/419, 430, 442

[56] References Cited

U.S. PATENT DOCUMENTS

| | | | |
|---|---|---|---|
| 4,758,946 | 7/1988 | Shar et al. | 395/416 |
| 4,775,932 | 10/1988 | Oxley et al. | 395/600 |
| 4,797,810 | 1/1989 | McEntee et al. | 395/600 |
| 4,800,520 | 1/1989 | Iijima | 235/382 |
| 4,896,262 | 1/1990 | Wayama et al. | 395/500 |
| 4,985,829 | 1/1991 | Thatte et al. | 395/417 |
| 5,200,959 | 4/1993 | Gross et al. | 371/21.6 |
| 5,270,979 | 12/1993 | Harari et al. | 365/185.09 |
| 5,313,611 | 5/1994 | Franklin et al. | 395/416 |
| 5,321,836 | 6/1994 | Crawford et al. | 399/416 |
| 5,630,093 | 5/1997 | Holzhammer et al. | 395/442 |

FOREIGN PATENT DOCUMENTS

| | | |
|---|---|---|
| 2088442 | 1/1993 | Canada. |
| 0175458 | 3/1986 | European Pat. Off.. |
| 0392895 | 10/1990 | European Pat. Off.. |
| 2251323 | 7/1992 | United Kingdom. |
| 2251323 B | 7/1992 | United Kingdom. |
| 2251324 | 7/1992 | United Kingdom. |

OTHER PUBLICATIONS

Brian Dipert et al., "Chapter Nine: Flash Memory File Systems," *Designing with Flash Memory*, Annabooks, pp. 227–271 (1993).

"Section—6 Execute in Place (XIP)," PC Card Standard, Release 2.0, Personal Computer Memory Card International Association, pp. 6–1 through 6–38 (Sep. 1991).

(List continued on next page.)

*Primary Examiner*—David K. Moore
*Assistant Examiner*—Kevin Verbrugge
*Attorney, Agent, or Firm*—Blakely, Sokoloff, Taylor & Zafman

[57] ABSTRACT

A method for managing and addressing an executable-in-place (XIP) program stored in a memory having a plurality of blocks includes the step of virtually storing a first portion of the XIP program in a first page of a paged virtual memory space and a second portion of the XIP program in a second page of the paged virtual memory space. The first portion of the XIP program is physically stored in a first block of the plurality of blocks and the second portion of the XIP program is physically stored in a second block of the plurality of blocks. A memory address mapping window is established with addresses of the first block. A page map for mapping the memory address mapping window to the first page is established. The first block is addressed for the first portion of the XIP program via the page map and the memory address mapping window. The memory address mapping window is updated with addresses of the second block and the page map is remapped to the second page when the second portion of the XIP program requires to be accessed such that the XIP program can be directly executed from the memory without being required to be stored contiguously in the memory and without being partitioned from other files that are not XIP programs.

22 Claims, 9 Drawing Sheets

OTHER PUBLICATIONS

Steven Wells et al., "Flash Solid-State Drive with 6MB/s Read/Write Channel and Data Compression," *Flash Memory: vol. II*, Intel Corporation, pp. 10-1 through 10-2 (1993).

Walter Chen, "Flash: Big News in Storage? Are Diskless Computers the Wave of the Future?" *Flash Memory: vol. II*, Intel Corporation, pp. 10-4 through 10-6 (1993).

"Flash Drive iFD005P2SA/iFD010P2SA." *Flash Memory: vol. II*, Intel Corporation, pp. 7-1, 7-2, 7-4, 7-16, and 7-19 through 7-21 (1993).

EXECUTION IN PLACE OF A FILE STORED NON-CONTIGUOUSLY IN A NON-VOLATILE MEMORY

This is a continuation of application Ser. No. 08/315,228 filed Sep. 29, 1994 abandoned.

FIELD OF THE INVENTION

The present invention pertains to the field of computer memory management systems. More particularly, this invention relates to storing and executing an executable-in-place ("XIP") program in a flash memory file management system, wherein the XIP program is stored non-contiguously and yet can still be executed in place from the nonvolatile memory.

BACKGROUND OF THE INVENTION

One type of prior art nonvolatile mass storage device for a computer system is a hard (i.e., fixed) disk drive. Data and code files are stored in the hard disk drive in certain format and when required, are downloaded into a RAM ("Random Access Memory") type system memory for execution.

One disadvantage of the prior art disk drive is the relatively large size of the device with mechanical components. This typically hinders portable personal computers that are equipped with such drives from becoming even smaller and portable. In addition, the mechanical components of the prior art disk drive typically require relatively large amount of power and energy to drive.

Another disadvantage of the prior art hard disk drive is that the data or code files stored in the device have to be downloaded to the system RAM before being executed. This typically requires time to download the files. In addition, a relatively large system RAM is typically required to store the downloaded files. This typically increases manufacturing cost and power consumption of the computer system.

Another type of prior art nonvolatile mass storage device for a computer system is a flash memory card. A prior art flash memory card typically includes flash electrically Erasable and Programmable Read-Only Memories ("flash EPROMs"). The flash memory card allows data files and application programs to be stored on the purely solid-state medium of the flash EPROMs. System resident file management system for the flash memory card manages files stored in the card.

The prior art flash memory card typically includes a microprocessor interface that permits direct access to the codes stored in the flash memory card without downloading the codes into a RAM-type system memory. This therefore allows the codes to be executed in place when the codes are stored contiguously within the prior art flash memory card such that a program counter of a central processing unit ("CPU") of the computer system can step through the codes. Execution in place means that the CPU can execute code directly from a flash EPROM array without the need for a redundant RAM-type memory. This in turn reduces the system cost and power and energy consumption that would otherwise be required by the extra RAM. As is known, the manufacturing cost of flash EPROM is typically less than that of RAM. Execution in place is also referred to as direct or in-place code execution. The codes stored in the flash memory card that can be executed in place are therefore referred to as executable-in-place or XIP codes.

Because the XIP programs are executed in place from the flash memory array, they typically need to be stored contiguously and cannot be mixed with other data files that are not executable-in-place and therefore need to be partitioned from those non-XIP files. The non-XIP files are typically downloaded into the system RAM for execution. Because of this, each of the non-XIP files can be stored non-contiguously in the flash memory card and reconstructed into a contiguous form in the system RAM for execution. These non-XIP files are, therefore, referred to as relocatable files.

FIG. 1 shows the memory map 10 of a partitioned flash memory card. As can be seen from FIG. 1, memory map 10 includes a data file storage area 11 and an XIP program storage area 12 for storing XIP 30 programs or files. The two areas 11 and 12 are partitioned by a partition 10a. Storage area 11 stores all non-XIP data files and storage area 12 stores all XIP programs. Each of the XIP programs is stored contiguously in storage area 12 such that direct execution is possible.

Disadvantages are, however, associated with such arrangement for storing XIP programs. One disadvantage is that another data standard is typically required for storing the XIP programs. Because the XIP programs require to be stored contiguously, the XIP programs typically cannot be stored within a standard file system format, which allocates and relocates a data file in units much smaller than the size of an XIP program. Therefore, a different data standard is typically required for storing the XIP programs.

Another disadvantage of this prior art arrangement is that another file management system is also required to manage the XIP programs. Again this is due to the fact that unique constraints (i.e., fixed size and contiguity) are placed on storing the XIP programs such that they can be executed directly from where they are stored. These constraints prevent the XIP programs from being managed by a general purpose flash file management system that typically allocates and relocates data files.

Another disadvantage is that special considerations are typically required to be given to the fact that the memory array is typically block erasable when developing and installing XIP software programs.

SUMMARY AND OBJECTS OF THE INVENTION

One of the objects of the present invention is to store an XIP program non-contiguously in a nonvolatile memory while the XIP program can still be executed in place.

Another object of the present invention is to provide unlimited storage space for an XIP program in a nonvolatile memory while the nonvolatile memory is only window mapped into the system memory of a computer system.

Another object of the present invention is to allow an XIP program to be stored in a nonvolatile memory unpartitioned from other non-XIP programs or data.

A further object of the present invention is to provide an arrangement for addressing and executing in-place an XIP program stored non-contiguously in a nonvolatile memory.

A still further object of the present invention is to provide an arrangement for storing and executing an XIP program directly through a solid-state nonvolatile memory file system data structure.

A method for managing and addressing an executable-in-place (XIP) program stored in a memory having a plurality of blocks includes the step of virtually storing a first portion of the XIP program in a first page of a paged virtual memory space and a second portion of the XIP program in a second page of the paged virtual memory space. The first portion of the XIP program is physically stored in a first block of the plurality of blocks and the second portion of the XIP program is physically stored in a second block of the plurality of blocks. A memory address mapping window is established with addresses of the first block. A page map for mapping the memory address mapping window to the first page is established. The mapping window is used to map the addresses of the memory into a system memory space and the page map is used for mapping the paged virtual memory space into the system memory space. The first block is addressed for the first portion of the XIP program via the page map and the memory address mapping window. The memory address mapping window is updated with addresses of the second block and the page map is remapped to the second page when the second portion of the XIP program requires to be accessed such that the XIP program can be directly executed without being required to be stored contiguously in the memory and without being partitioned from other files that are not executable-in-place.

A data processing system includes a processing unit for executing an executable-in-place (XIP) program virtually stored in first and second pages of a paged virtual memory space and a memory arranged into a plurality of blocks. The XIP program is physically stored in first and second blocks of the plurality of blocks. A memory address mapping window is provided for storing addresses of one of the plurality of blocks to be accessed. A page map is provided for mapping the window to one of the first and second pages. The mapping window is used to map the addressees of the memory into a system memory space and the page map is used for mapping the paged virtual memory space into the system memory space. An address translation logic is provided for accessing the page map and the window to translate virtual addresses of one of the first and second pages into the addresses of one of the first and second blocks when the processing unit accesses the associated one of the first and second pages for the XIP program such that the XIP program can be directly executed from the memory. A logic is provided for updating the window with the addresses of another one of the first and second blocks and for remapping the page map to another one of the first and second pages when a page fault condition occurs such that the XIP program can be directly executed without being required to be stored contiguously in the memory and without being partitioned from other files that are not executable-in-place.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
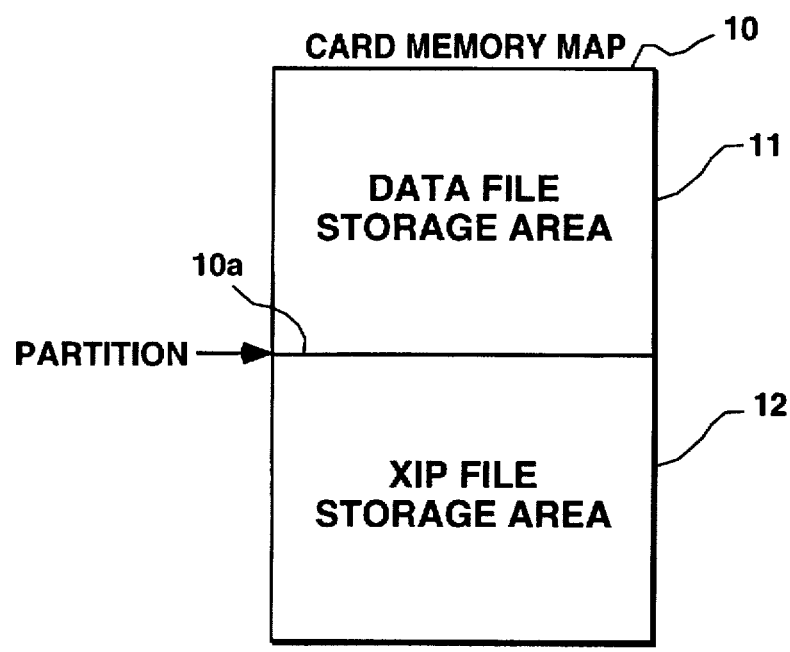
FIG. 1 shows the memory map of a prior art partitioned flash memory array for storing XIP programs and non-XIP programs.
Figure 2:
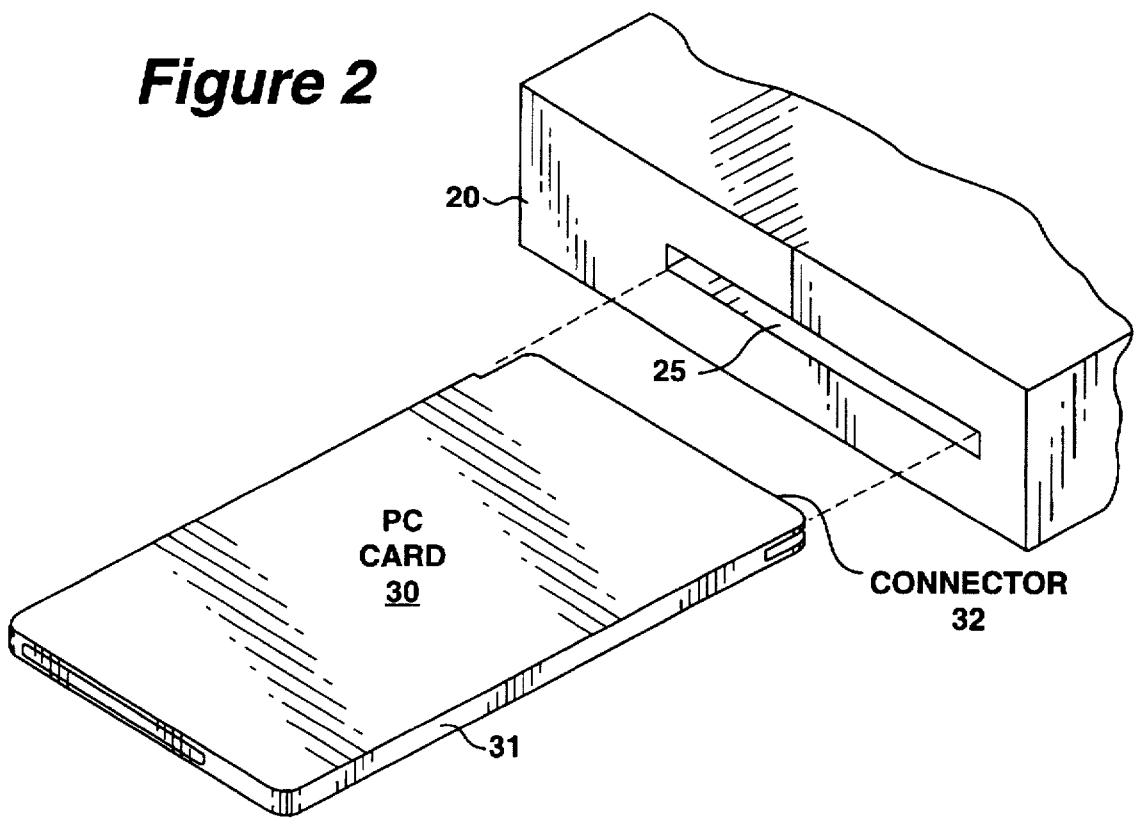
FIG. 2 is a perspective view of a portion of a computer system and a flash memory card to be inserted in the computer system.

FIG. 2 is a perspective view of a flash memory card 30. Inside case 31 of flash memory card 30, there are a plurality of flash EPROMs (not shown in FIG. 2) for storing data at addresses. Flash memory card 30 is inserted into a slot of opening 25 of a computer system 20 for a memory read or write operation. The architecture of computer system 20 is shown in block diagram of FIG. 3, which implements an embodiment of the present invention described in more detail below, also in conjunction with FIGS. 4–9.

Alternatively, flash memory card 30 can be an array of flash EPROMs mounted inside computer system 20.

Figure 3:
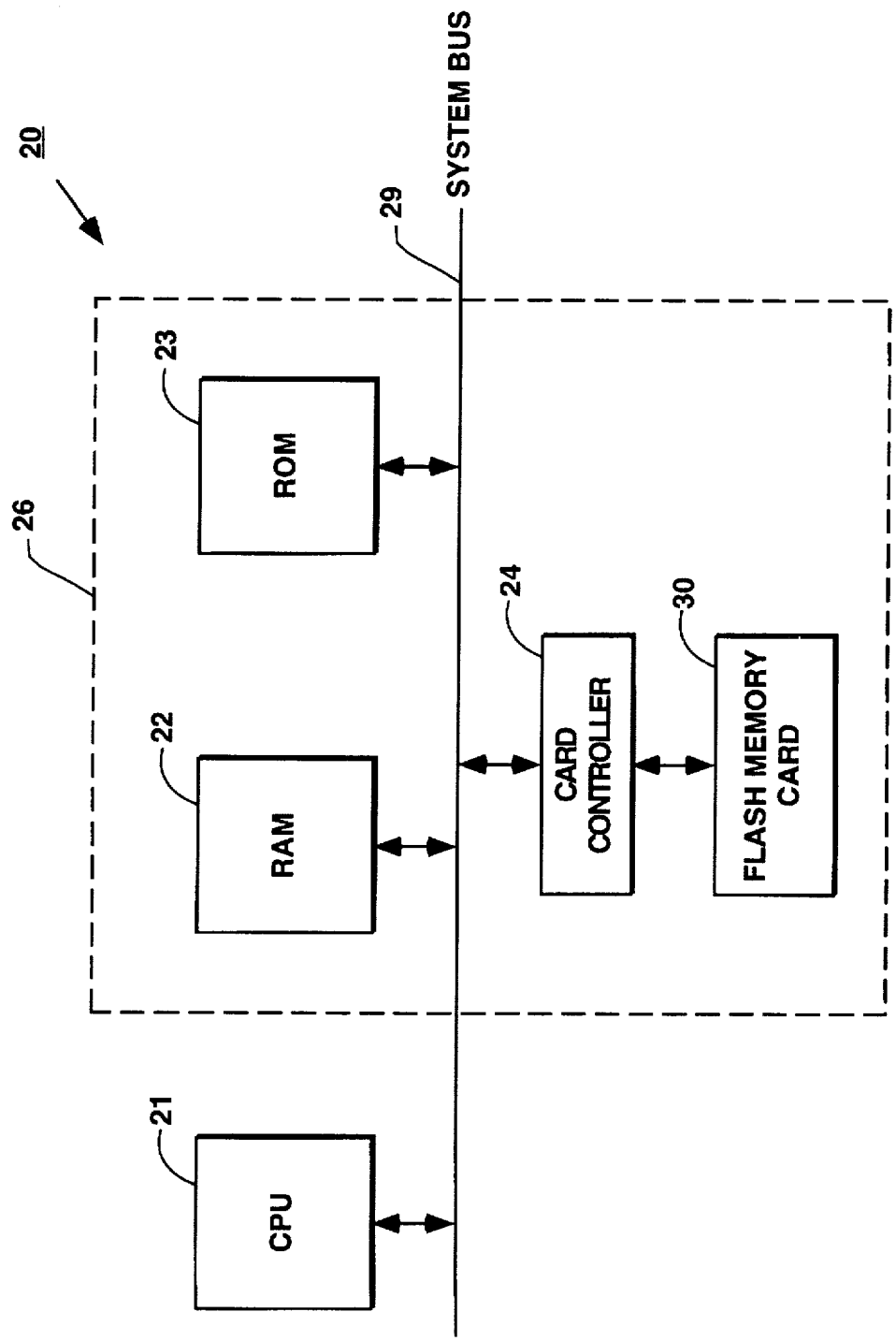
FIG. 3 is a block diagram of the computer system of FIG. 2 when the flash memory card is inserted into the computer system, wherein the computer system includes a card controller for interfacing with the flash memory card.

Referring to FIG. 3, computer system 20, for one embodiment, is a personal computer system. For alternative embodiments, computer system 20 comprises a portable computer, a workstation computer, a minicomputer, a mainframe computer, or any other type of computer or data processing system.

Computer system 20 includes a central processing unit ("CPU") 21. For one embodiment, CPU 21 comprises an i386™ microprocessor manufactured and sold by Intel Corporation of Santa Clara, Calif. Alternatively, CPU 21 can comprise other types of microprocessors manufactured and sold by Intel Corporation. For one embodiment, CPU 21 includes an integrated virtual memory management mechanism that includes a paging and segmentation unit, which will be described in more detail below.

CPU 21 is coupled to a system bus 29 of computer system 20. Computer system 20 includes a RAM 22 and a ROM 23 coupled to bus 29. RAM 22 is used in computer system 20 to store updatable data or programs. ROM 23 is used in computer system 20 to store programs that do not require any update during execution.

Computer system 20 further includes card controller 24. Card controller 24 is also coupled to system bus 30. As can be seen from FIG. 3, card controller 24 interfaces with flash memory card 30 when flash memory card 30 is inserted into slot 25 (FIG. 2) of computer system 20. Card controller 24 is used in computer system 20 to control operations of flash memory card 30. Flash memory card 30 includes a number of flash EPROMs (not shown). For one embodiment, flash memory card 30 includes twenty flash EPROMs, each storing sixteen megabits ("Mbits") of data. This allows flash memory card 30 to store forty megabytes of data. For another embodiment, flash memory card 30 includes thirty-two flash EPROMs, each storing sixteen Mbits of data. This allows flash memory card 30 to store sixty-four megabytes of data. Alternatively, flash memory card 30 may include more or fewer than twenty or thirty-two flash EPROMs.

Flash memory card 30 is managed by a flash memory file management system (not shown in FIG. 3). The flash memory file management system can be any known flash file management system or flash filing system. The flash memory file management system is a data file storage and memory management for flash memory card 30. For one embodiment, the flash memory file management system is a software stored in RAM 22, ROM 23, or flash memory card 30. When executed, the flash memory file management system is downloaded from ROM 23 or flash memory card 30 into RAM 22 for execution.

The flash memory file management system interfaces with an operating system (not shown) of computer system 20. The flash memory file management system stores data and programs in available free space of flash memory card 30, monitors the card memory array of flash memory card 30 for available free space, and initiates clean-up operations to reclaim dirty space for storage.

In particular, the memory array of flash memory card 30 is divided into a number of fixed-size blocks or sectors for storing data or programs. Alternatively, each of the storage blocks of flash memory card 30 can be of variable size. When a program or data file needs to be stored in the memory array of flash memory card 30, the flash memory file management system finds available free space in a block or blocks to store the file. When the flash memory file management system is to find free space in different blocks, the file is broken into many small pieces in order to store the file in the available free space of those blocks. These pieces of the file are then stored in those blocks in the form of a chain. The flash memory file management system also creates an allocation table to store information that links these pieces of the file together. The allocation table may be stored in one place of flash memory card 30 or distributed throughout flash memory card 30. In addition, the allocation table may be stored in places other than flash memory card 30, for example RAM 22. The flash memory file management system develops and maintains a linked list structure with respect to file and directory entries of the files and directories stored in flash memory card 30.

For one embodiment, the flash memory file management system stores data or code files in flash memory card 30 in 64 Kbyte or 128 Kbyte units. This means that the flash memory file management system divides a data or code file into pieces, each being stored in a 64 Kbyte or 128 Kbyte storage segment of the memory array of flash memory card 30. Alternatively, each segment of flash memory card 30 can be smaller than 64 Kbytes or larger than 128 Kbyte bytes.

When a file or a piece of the file stored in a portion of an erasure block needs to be deleted, that portion of the erasure block is marked as dirty. When the erasure block contains too much dirty space, a clean-up operation is needed to reclaim the block. This is due to the fact that the dirty space of the block cannot simply be overwritten with new data.

As is known, each cell of a flash memory array cannot be overwritten without a prior erasure. This necessity for erasure prior to overwriting requires the flash memory file management system to perform the clean-up operation for a dirty erasure block in order to rewrite data to the erasure block.

The clean-up operation first involves a relocation operation during which, all currently active files stored in the to-be-erased block are copied to available free space of other erasure blocks. The erasure block is then erased and becomes a free block.

Referring again to FIG. 3, CPU 21 can access RAM 22, ROM 23, and flash memory card 30 for memory operations. RAM 22, ROM 23, and flash memory card 30 constitute a system memory 26 of computer system 20. System memory 26 of computer system 20 can be directly accessed by CPU 21 during operations of computer system 20.

Figure 4:
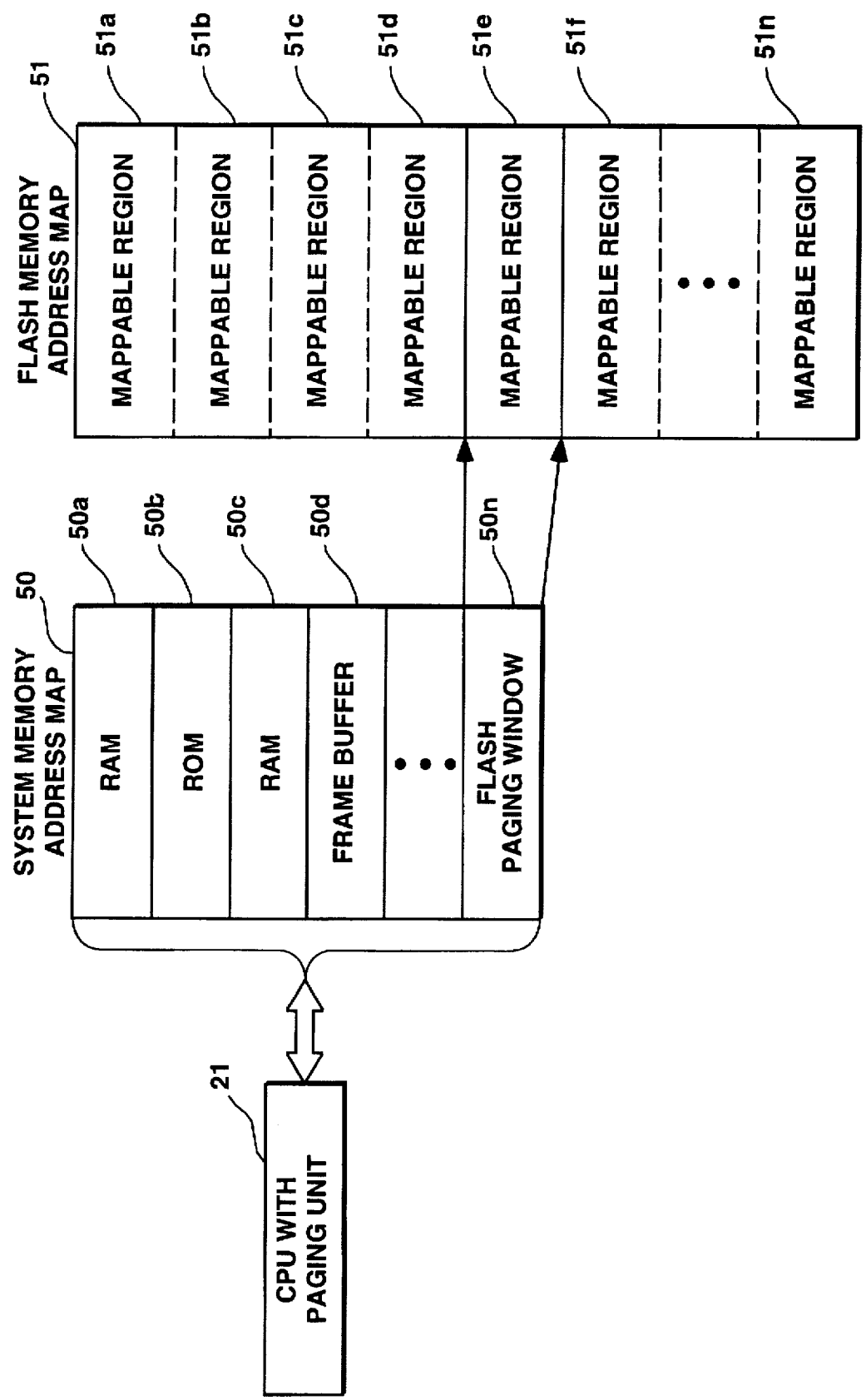
FIG. 4 shows the system memory address map of the computer system of FIGS. 2 and 3, wherein memory space of the flash memory card of FIGS. 2 and 3 is only window mapped into the system memory address map.

For one embodiment, the memory array of flash memory card 30 is window mapped into the address space of system memory 26. This allows CPU 21 to directly access memory regions of flash memory card 30. CPU 21 can access one mapped region of flash memory card 30 at one time via the window. This scheme is referred to as flash window memory mapped scheme. The window can be changed to point to a different memory segment of flash memory card 30. FIG. 4 is a memory address map 50 for system memory 26 which shows the flash window memory mapped scheme for flash memory card 30. FIG. 4 will be described in more detail below.

For alternative embodiments, other mapping schemes can be used to map the memory space of flash memory card 30 into the address space of system memory 26. For example, the entire memory array of flash memory card 30 can be directly mapped into the address space of system memory 26. This is referred to as direct memory mapped method.

Referring now to FIG. 4, RAM 22 and ROM 23 are directly mapped into system memory address map 50. In addition, a frame buffer is also mapped into system memory address map 50. The frame buffer stores frame data to be displayed on a display of computer system 20.

System memory address map 50 also includes a flash memory paging window 50n. Flash memory paging window 50n is also referred to as flash memory address mapping window. Paging window 50n is used for mapping one of a number of mappable regions 51a–51n of flash memory address map 51 of flash memory card 30 into system memory 26. Paging window 50n is within the address space of CPU 21, as shown in FIG. 4. The location of paging window 50n can be anywhere within system memory address map 50. As can be seen from FIG. 4, region 51e of flash memory address map 51 is currently the mapped region.

Paging window 50n allows for connecting an area of system memory 26 to the memory of flash memory card 30. When CPU 21 or other system master of computer system 20 sends out an address that corresponds to the area designed for the window, flash memory card 30 is selected, which then becomes accessible to the system. By doing so, flash memory card 30 can be directly accessed by CPU 21. CPU 21, however, can only access the mapped page of the memory array of flash memory card 30 at one time. If CPU 21 is to access a memory page of flash memory card 30 that is not mapped in paging window 50n, paging window 50n needs to be re-mapped to that page such that CPU 21 can access that page.

When paging window 50n maps the addresses of region 51e of flash memory address map 51, CPU 21 can address region 51e via paging window 50n. When CPU 21 needs to access another region, for example region 51a, of flash memory address map 51 of flash memory card 30, paging window 50n is then updated or reconfigured to map the addresses of region 51a and CPU 21 can directly access region 51a via paging window 50n. By mapping different regions of card memory address map 51 into paging window 50n, CPU 21 is allowed to access the entire memory array of flash memory card 30.

Figure 7:
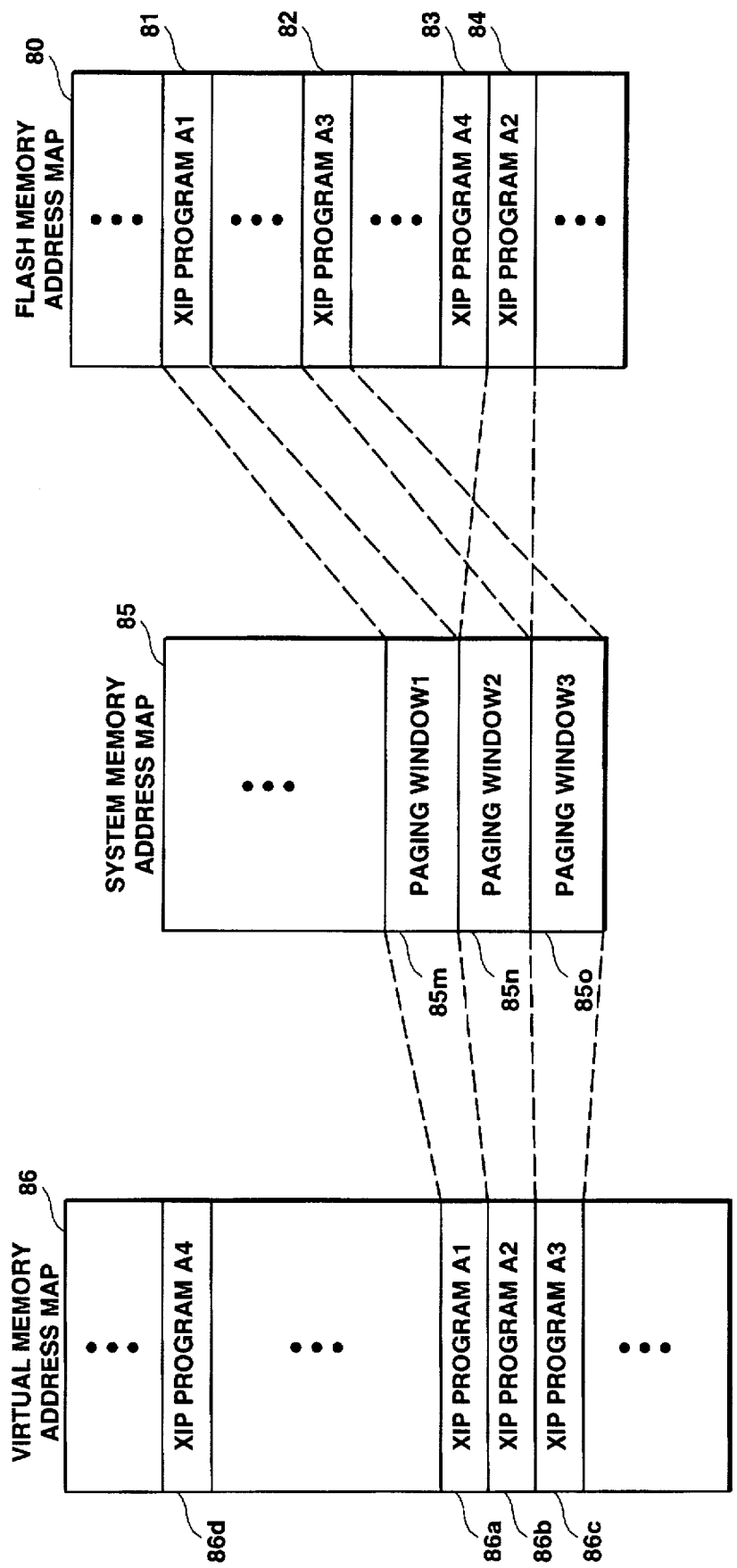
FIG. 7 illustrates another embodiment of the memory paging and window mapping system of FIG. 5 when storing the XIP program.

Alternatively, system memory address map 50 includes more than one paging windows, each for mapping one of mappable regions 51a through 51n into address map 50, as shown in FIG. 7. FIG. 7 will be described in more detail below.

As can be seen from FIGS. 3 and 4, the address contiguity of flash memory card 30 is destroyed when the address space of flash memory card 30 is window mapped into the address space of system memory 26. When an XIP program is stored in the window memory mapped array of flash memory card 30, the XIP program cannot have direct code execution from all the memory array. Another reason is that during the execution of the XIP program, data may relocate dynamically. The XIP program is executable in-place only when the XIP program is stored in one page of the memory array of flash memory card 30.

Figure 5:
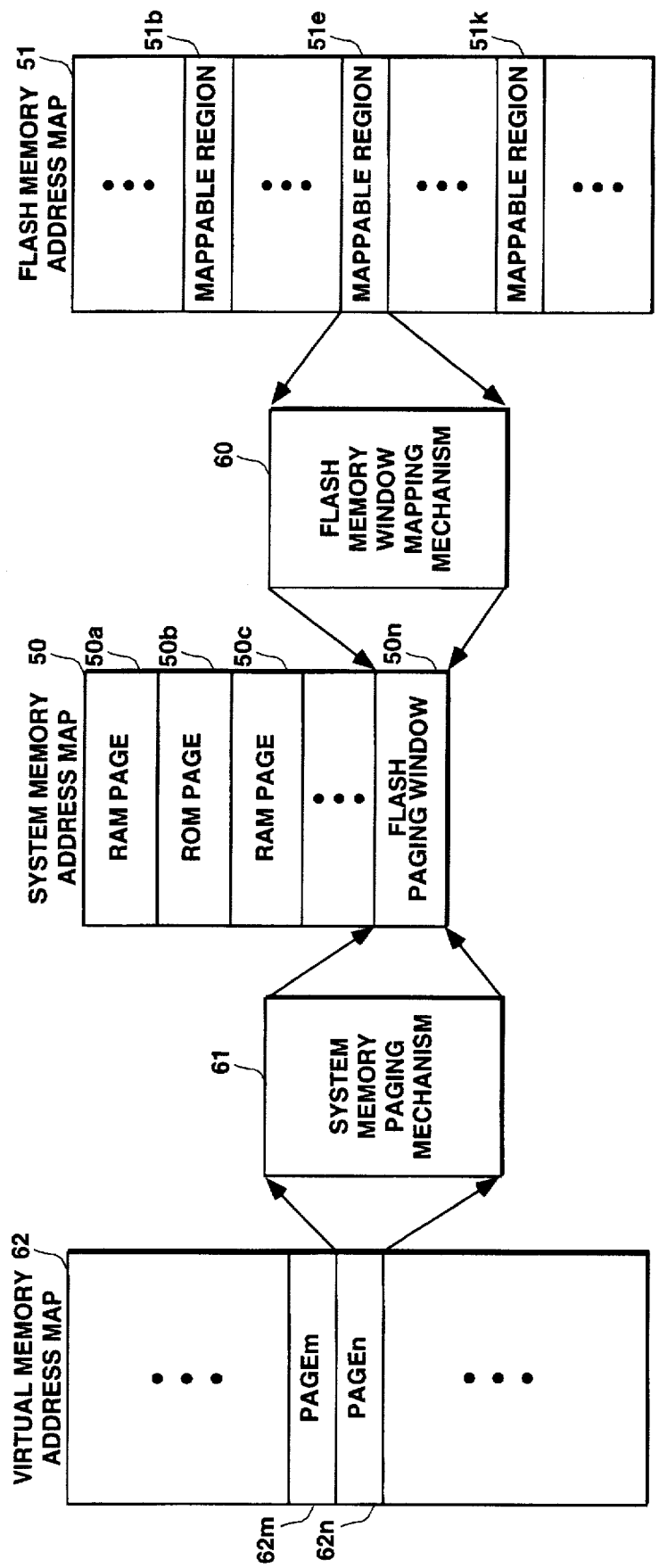
FIG. 5 illustrates the memory paging and window mapping system of the computer system of FIGS. 3 and 4 with virtual addressing space.

Paging window 50n may directly map one of regions 51a–51n of flash memory address map 51 into system memory address map 50 or translates the CPU addresses into the corresponding physical memory addresses of flash memory card 30. When paging window 50n directly maps a region of flash memory address map 51 into system memory address map 50, no address translation is performed on the CPU addresses. When paging window 50n translates the CPU addresses into the corresponding physical memory addresses of flash memory card 30, an address translation logic is provided to perform the address translation, as can be seen from FIG. 5. FIG. 5 shows flash memory window mapping mechanism 60 that includes the address translation logic. The address translation logic can be implemented by any known circuits or techniques. FIG. 5 will be described in more detail below.

For one embodiment, paging window 50n is supported and implemented by card controller 24 of FIG. 3. Card controller 24 provide a set of registers that store a window start system memory address (i.e., base address), a window stop system memory address (i.e., maximum address) and a window size value (i.e., flash memory card offset address).

For one embodiment, each of regions 51a–51n that can be mapped into paging window 50n has sixty-four Kbyte memory space. For alternative embodiments, each of regions 51a–51n can be larger or smaller than sixty-four Kbytes.

Paging window 50n is configured in card controller 24 by the flash memory file management system. In addition, the flash memory file management system may open multiple paging windows in card controller 24 that map into separate sections of flash memory card 30 simultaneously, as shown in FIG. 7. For this embodiment, however, CPU 21 can still only access one paging window at one time.

As can be seen from FIG. 4, flash memory card 30 is accessed when paging window 50n is enabled and accessed. When region 51e of flash memory address map 51 is mapped into paging window 50n and when the system memory address (i.e., the CPU address) finds its entry in paging window 50n, the system memory address is then used to address region 51e. When the system memory address is beyond the mapped address range of paging window 50n, region 51e is not addressed by the system memory address and the flash memory file management system of flash memory card 30 maps a different one of regions 51a–51n into paging window 50n that includes the entry for the system memory address.

For one embodiment, the flash memory file management system reconfigures paging window 50n to map a different one of regions 51a–51n into system memory address map 50 whenever CPU 21 has a page fault interrupt. This will be described in more detail below.

Referring to FIGS. 3 and 4, in order for CPU 21 to read or write an item of data, such item of data must reside within the address space of system memory 26. Thus, if the size of a program exceeds the address space of system memory 26, provision must be made to swap portions of the program between the mapped region of flash memory card 30 with the regions of flash memory card 30 that are not mapped into system memory address space. In order to relive the programmer of this responsibility, virtual memory technique is used to increase the apparent address space of system memory 26. This illusion of a larger system memory address space is implemented by modifications that permit the operating system to replace unused blocks of words in the address space of system memory 26 with relevant blocks of words from the unmapped regions of flash memory card 30 as the user addresses data that is not within the address space of system memory 26.

Every virtual memory computer system has to provide some mechanism to translate a "virtual address" memory. This is usually done by dividing the virtual addressing space into chunks and providing a translation or mapping system between an address designating a particular chunk in the virtual address space and the address of the corresponding chunk in system memory 26. Where such chunks are of fixed size, they are typically referred to as "page" which will be the term used in the remainder of this application.

FIG. 5 shows a virtual memory address map 62 that represents the virtual address memory of CPU 21. As can be seen from FIG. 5, virtual memory address map 62 is arranged into a number of virtual pages, including pages 62m and 62n. System memory address map 50 is also arranged into a number of physical pages 50a through 50n. Paging window 50n is one of the pages in system memory address map 50.

As can be seen from FIG. 5, the number of virtual pages of virtual memory address map 62 is much more than that of the physical pages of system memory address map 50. FIG. 5 illustrates the address map of one virtual space. Alternatively, each process running on computer system 20 of FIG. 3 may have its own virtual memory space, with a number of virtual subspaces.

For each page that can be addressed in virtual memory address map 62, there must exist a page descriptor which describes the state of that page in reality. The page may or may not reside in the system memory address space at any instant. If the page is in the CPU address space of system memory 26, the descriptor will indicate that fact and will indicate the location of the page in system memory 26. If the page is not in the CPU address space of system memory 26, but is in the unmapped regions of flash memory card 30, the descriptor will indicate that fact and will contain enough information for the system to access the page. The collection of all the page descriptors for a virtually addressable space is called a page map, and since each of the descriptors is an entry in this map, the page descriptors are referred to as the page map entries (PMEs).

As can be seen from FIG. 5, the virtual addresses for virtual memory address map 62 are translated into the physical addresses of system memory address map 50. This is done by a system memory paging mechanism 61. Paging mechanism 61 can be any kind known paging mechanism. Paging mechanism 61 can be a hardware or software implementation or a combination of both. For one embodiment as shown in FIG. 4, paging mechanism 61 is implemented by the paging unit of CPU 21. Alternatively, a software program running on CPU 21 may perform the address translation function. In addition, paging mechanism 61 may be implemented by an independent integrated circuit. U.S. Pat. No. 4,758,946, issued Jul. 19, 1988, and entitled PAGE MAPPING SYSTEM, describes a page mapping system for virtual memory.

As described above, CPU 21 has a paging for implementing a paged memory management mechanism for CPU 21. The paging unit is integrated in CPU 21 and is designed to support demand-paged virtual memory system. The paging unit and its functions are described in U.S. Pat. No. 4,972,338, issued Nov. 20, 1990, and entitled MEMORY MANAGEMENT FOR MICROPROCESSOR SYSTEM.

The paging unit of CPU 21 causes CPU 21 to generate a page fault interrupt or condition when the virtual address to a virtual page of virtual memory address map 62 that currently does not have a corresponding page in system memory address map 50. The page fault interrupt is a hardware generated interrupt that interrupts CPU 21 to bring the corresponding page into system memory address map 50 and to update the page map information in the paging unit of CPU 21 in order to map the virtual page to the corresponding page in system memory address map 50. In addition, the page fault interrupt is also generated when the system memory address is directed to a memory location outside the currently accessed page. The handling of the page fault interrupt by CPU 21 is performed by software program.

Alternatively, the paging unit of CPU 21 also includes a page fault detection and correction circuit for detecting the page fault condition and for correcting the page fault condition by causing the corresponding page to be brought into system memory address map 50 and updating the page map information to map the virtual page to the corresponding page in system memory address map 50. The page fault detection and correction circuit can be implemented by any known circuit.

Figure 6:
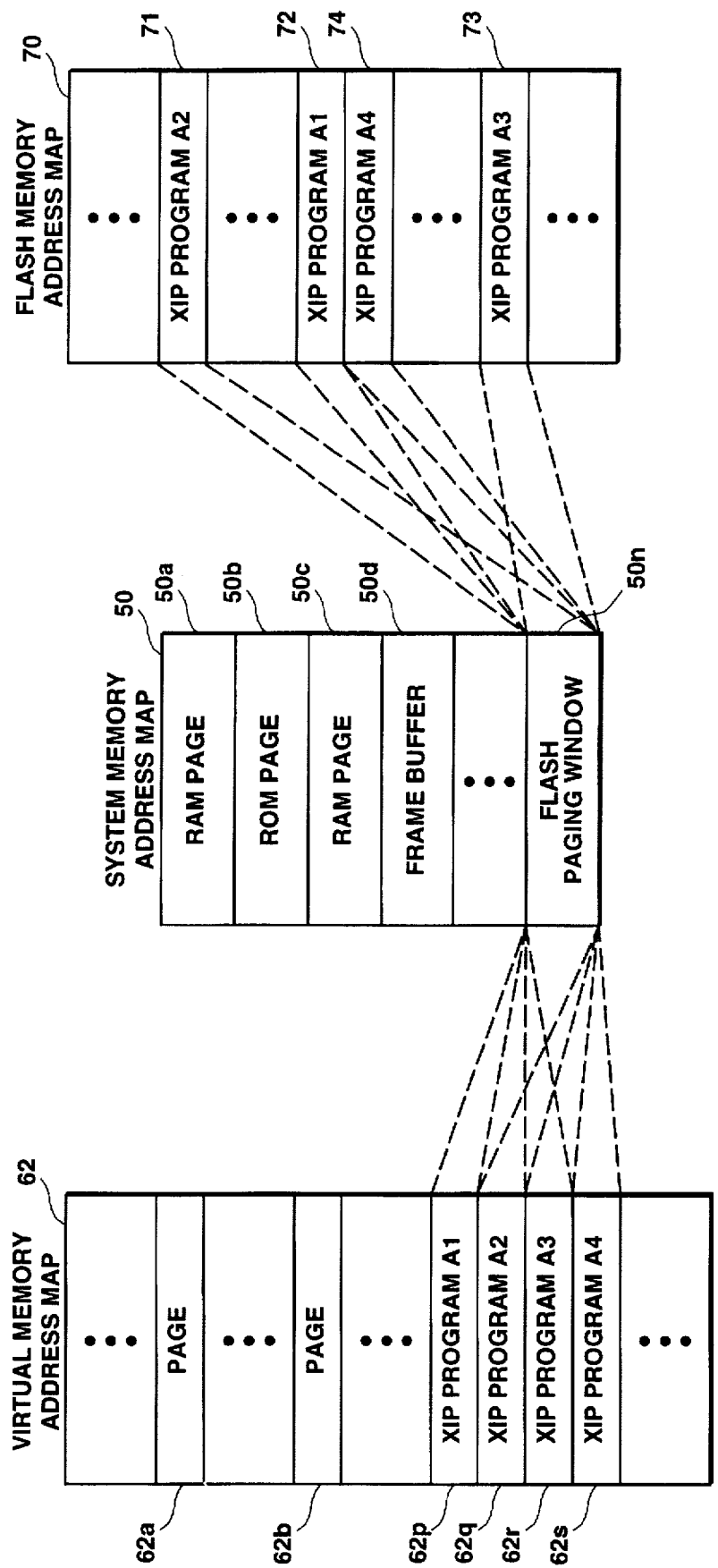
FIG. 6 illustrates the memory paging and window mapping system of FIG. 5 when storing an XIP program in accordance with one embodiment of the present invention.
Figure 8:
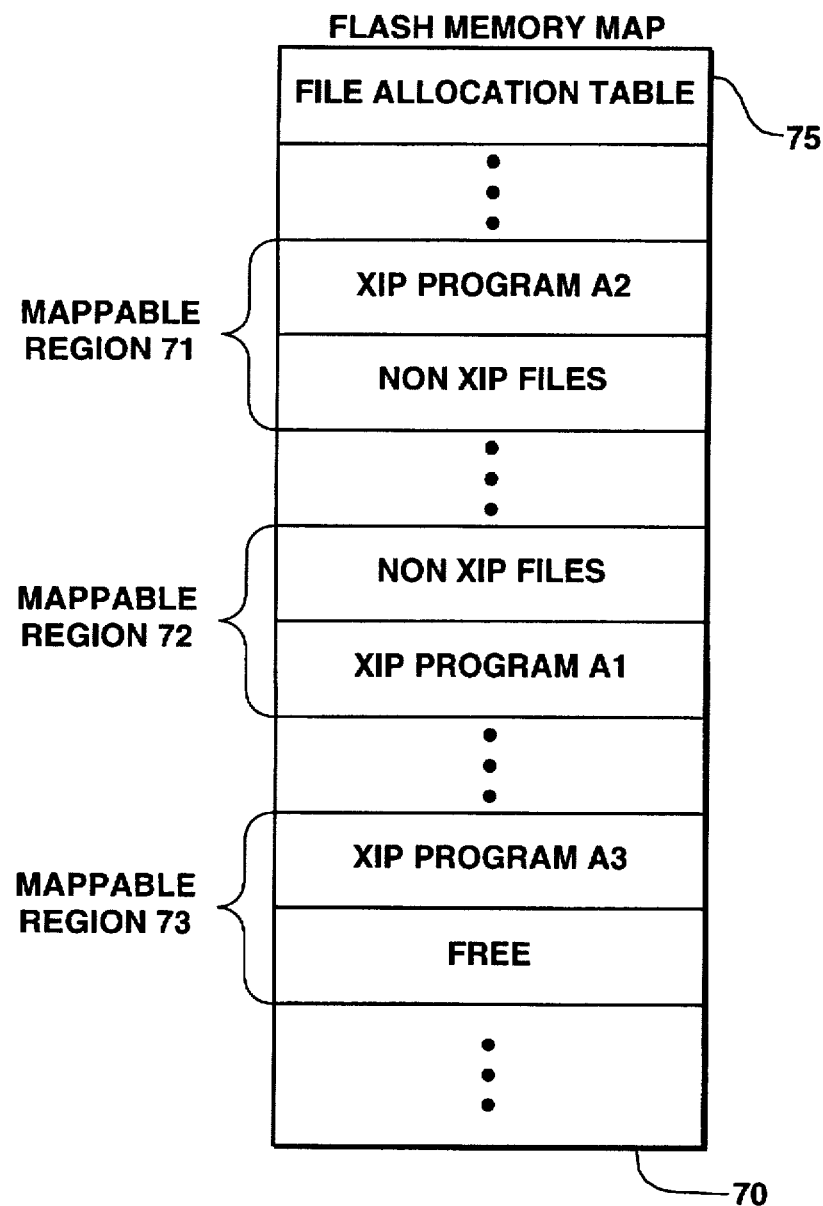
FIG. 8 shows the memory map of the flash memory card of FIGS. 3 and 4 that stores the XIP program non-contiguously.
Figure 9:
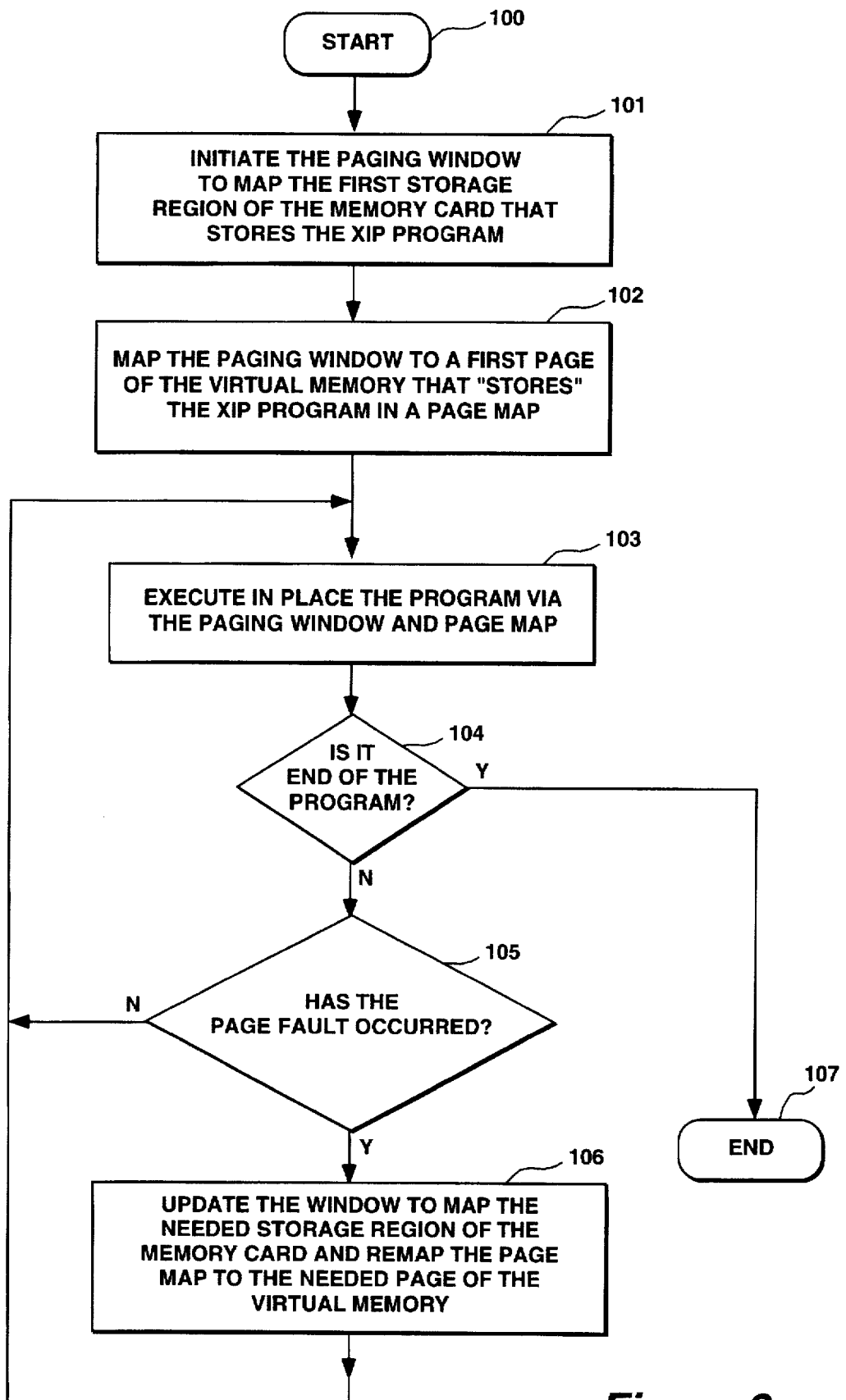
FIG. 9 is a flow chart diagram of the process of executing the XIP program directly from the flash memory card of FIGS. 3 and 4, wherein the program is stored in the flash memory card in the form as shown in FIGS. 5–8.

The page fault interrupt mechanism implemented by the paging unit of CPU 21 allows the flash memory file management system to reconfigure paging window 50n to map a different region of regions 51a–51n into paging window 50n every time CPU 21 has a page fault interrupt. By doing so, CPU 21 can access and execute an application program directly from flash memory card 30 (i.e., execute-in-place) even though the application program is not stored contiguously in flash memory card 30. Based on the allocation table, the respective one of regions 51a–51n that contains a next piece of the application program is mapped into paging window 50n whenever CPU 21 is page-fault interrupted. This allows an XIP program to be stored non-contiguously in flash memory card 30 while still being executed in place. FIG. 6 shows storing an XIP program A in flash memory card 30 and addressing and executing the XIP program A via the demand-paged virtual memory window mapping system of FIG. 5. FIG. 7 shows another embodiment of the system shown in FIG. 5, wherein more than one paging windows are provided to access various regions of flash memory card 30. FIG. 8 shows memory map 70 of flash memory card 30 of FIG. 6 in storing the XIP program A non-contiguously under the flash memory file management system. FIG. 9 shows the flow chart of the process of directly executing the XIP program from the memory array of flash memory card 30, wherein the XIP program is stored in the form as shown in FIGS. 6 and 8. FIGS. 6 through 9 will be described in more detail below.

As can be seen from FIG. 6, the XIP program A is separated into four pieces, each being stored in one mappable region of memory map 70 of flash memory card 30. For example, portion one of the XIP program A (i.e., XIP program A1) is stored in region 72 of memory map 70 and portion two of the XIP program A (i.e., XIP program A2) is stored in region 71. In addition, the XIP program A is "stored" in four contiguous pages 62p through 62s of virtual memory map 62. Paging window 50n maps one region of memory map 70 to system memory map 50 and the page map (not shown) maps paging window 50n to one of virtual pages 62p–62s of virtual memory address map 62. If one of virtual pages 62p–62s to which paging window 50n is not mapped is accessed by a virtual address, paging mechanism 61 (FIG. 5) generates a page fault interrupt to cause CPU 21 (FIG. 3) to update the page map such that paging window 50n is mapped to the virtual page addressed. Meanwhile, window mapping mechanism 60 is also caused to update paging window 50n in accordance with the update page map to map to the region of card memory address map 70 that corresponds to the addressed virtual page. For example, when paging window 50n is mapped to region 72 and virtual page 62r is addressed. A page fault condition will occur that interrupts CPU 21 to update the page map such that page 62r is mapped to paging window 50n. In addition, paging window 50n is also updated with addresses of region 73.

FIG. 7 shows another embodiment that is slightly different from the embodiment shown in FIGS. 5 and 6. In FIG. 7, three paging windows 85m through 85o are provided in system memory address map 85, each for mapping one region of card memory map 80 of flash memory card 30. The page fault condition occurs only when the accessed virtual page is not mapped into any of paging windows 85m through 85o. For example, if execution of the XIP program A is jumped from page 86a to page 86c, no page fault occurs. However, if page 86d is accessed, the page fault occurs.

FIG. 8 shows that the XIP program A can be stored in each of regions 71–73 with other non-XIP programs or files. Referring to FIG. 8, each of mappable regions 71 through 73 stores a portion of the XIP program A. Each of mappable regions 71 through 73 is one of regions 51a–51n of FIG. 5 and can be mapped into paging window 50n of FIG. 5. Regions 71 and 72 also store other non XIP programs or files. The allocation information that links the XIP program A stored in regions 71 through 73 is stored in an allocation table 75.

As can be seen from FIG. 8, the XIP program A is not partitioned from other non-XIP programs and is stored together with those non-XIP files. In addition, the XIP program A is not stored contiguously in flash memory card 30. Instead, the XIP program A is separately stored in different places of separate regions 71–73.

As can be seen from FIGS. 5–8, in accordance with one embodiment of the present invention, the XIP program A can still be executed directly from the memory array of flash memory card 30. This is done by using the CPU page fault interrupt of CPU 21 to cause window modification of paging window 50n of FIGS. 4–7 to map the next page of flash memory card 30 that stores the next piece of the XIP program A. The CPU page fault interrupt is a hardware interrupt as described above and is performed when needed. Each time when CPU 21 is page-fault interrupted, paging window 50n is caused to be updated to map a new page of flash memory card 30. This allows XIP program A not to require a software page interrupt in order to interrupt the current execution of the XIP program A when the execution reaches a page end of the XIP program A. In addition, the XIP program A does not need to know how it is stored in flash memory card 30 in order to stop the direct execution when the end of a page is reached. Moreover, this allows the flash memory file management system to store XIP programs non-contiguously in flash memory card 30 as relocatable files. The process of allowing the XIP program A to be executable in place in accordance with one embodiment of the present invention is shown in FIG. 9, which will be described in more detail below.

The process in accordance with one embodiment of the present invention is loaded into RAM 22 of system memory 26 prior to the execution of an XIP program. The process is implemented in an XIP application launcher or driver program. The XIP application launcher or driver program then runs the XIP program. The launcher program also initiates hardware address set up for paging window 50n and interfaces with the flash memory file management system.

As can be seen from FIG. 6, during the direct execution of the XIP program A, the process in accordance with one embodiment of the present invention first initializes paging window 50n to map region 72 which contains part one of the XIP program A (i.e., XIP program A1). When access to part two of the XIP program A is required during execution, CPU 21 generates the CPU page fault interrupt. This allows paging window 50n to be updated to map region 71. In addition, the page map is updated to map page 62q to paging window 50n. When the execution requires access to part three of the XIP program A, CPU 21 is again page-fault interrupted which causes paging window 50n to map region 73. Also, the page map is updated to map page 62r to paging window 50n.

Referring to FIGS. 6 and 9, the process in accordance with one embodiment of the present invention starts at step 100. At step 101, paging window 50n is initiated to map region 72 of flash memory card 30 that stores part one of the XIP program A. At step 102, page 62p is mapped to paging window 50n. At step 103, the program is accessed and executed in place via paging window 50n.

Step 104 is a judgment step at which it is determined whether an end of the program is reached. If the answer is yes, then the process ends at step 107. If the end of program is not reached at step 104, step 105 is then performed at which another judgment is made to determine if the CPU page fault interrupt has occurred. If not, the process returns to step 103 to continue the direct execution.

If, at step 105, it is determined that the CPU page fault interrupt has occurred, then step 106 is performed to map the next storage region (i.e., region 71) of flash memory card 30 that stores part two of the XIP program. In addition, the page map is updated to map page 62q to paging window 50n. The process then returns to step 103 to continue the direct code execution.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for executing-in-place a program stored in a nonvolatile memory, comprising the steps of:

a) mapping a first region of the nonvolatile memory into a paging window of a system memory address space for execution, wherein the first region stores a first portion of a program, wherein the program is stored non-contiguously in the nonvolatile memory;

b) storing a first page map entry corresponding to the first portion of the program in a virtual memory page map;

c) executing at least a portion of the program mapped into the paging window;

d) mapping a second region of the nonvolatile memory into the paging window for execution, wherein the second region stores a second portion of the program, wherein the first and second regions are non-contiguous regions of the nonvolatile memory;

e) storing a second page map entry corresponding to the second portion of the program in the virtual memory page map, wherein the second page map entry is contiguous to the first page map entry such that the first and second portions of the program are contiguously, sequently mapped in the virtual memory page map.

2. The method of claim 1 wherein each of the first and second regions corresponds to a block of nonvolatile memory.

3. The method of claim 1 wherein the first and second regions are directly mapped into the system memory address space.

4. The method of claim 1 wherein the first and second regions are not directly mapped into the system memory address space, wherein addresses associated with the paging window are translated into physical addresses for the first and second regions.

5. The method of claim 1 wherein the nonvolatile memory comprises flash memory.

6. The method of claim 1 further comprising the steps of:

f) receiving a virtual address;

g) generating a page fault if the virtual address corresponds to a virtual page of memory which does not have a corresponding region currently mapped into the system memory address space.

7. The method of claim 1 wherein the first and second portions are not stored in sequence within the nonvolatile memory.

8. A method for executing-in-place a program stored in a nonvolatile memory, comprising the steps of:

a) mapping a first region of the nonvolatile memory into a paging window of a system memory address space for execution, wherein the first region stores a first portion of a program, wherein the program is stored non-contiguously in the nonvolatile memory;

b) storing a first page map entry corresponding to the first portion of the program in a virtual memory page map;

c) executing at least a portion of the program mapped into the paging window;

d) generating a page fault interrupt, if a requested address does not correspond to any region currently mapped into the paging window;

e) mapping a subsequently needed region of the nonvolatile memory into the paging window for execution in response to the page fault interrupt, wherein the subsequently needed region is associated with the requested address, wherein the subsequently needed region stores a subsequently needed portion of the program, wherein the first and subsequently needed portions are non-contiguously stored in the nonvolatile memory;

f) updating the virtual memory page map to indicate the mapping of a page corresponding to the subsequently needed portion of the program, wherein the first and subsequently needed portions are sequentially, continuously mapped in the virtual memory page map; and g) repeating steps c) thru f) until execution of the program is completed.

9. The method of claim 8 wherein each of the first and subseqently needed regions corresponds to a block of nonvolatile memory.

10. The method of claim 8 wherein the first and second regions are directly mapped into the system memory address space.

11. The method of claim 8 wherein the first and subsequently needed regions are not directly mapped into the system memory address space, wherein addresses associated with the paging window are translated into physical addresses for accessing the first and subsequently needed regions.

12. The method of claim 8 wherein the nonvolatile memory comprises flash memory.

13. The method of claim 8 further comprising the steps of:

h) receiving a virtual address;

i) generating a page fault if the virtual address corresponds to a virtual page of memory which does not have an associated region currently mapped into the paging window of the system memory address space.

14. The method of claim 8 wherein in step e) the subsequently needed region is mapped into the paging window such that more than one region is mapped to the paging window at a same time.

15. The method of claim 8 wherein the first and subsequently needed portions of the program are not stored in sequence within the nonvolatile memory.

16. A method for executing-in-place a program stored in a nonvolatile memory, comprising the steps of:

a) mapping a first region of the nonvolatile memory into a first paging window of a system memory address space for execution, wherein the first region stores a first portion of a program, wherein the program is stored non-contiguously in the nonvolatile memory;

b) storing a first page map entry corresponding to the first portion of the program in a virtual memory page map;

c) mapping a second region of the nonvolatile memory into a second paging window of the system memory address space for execution, wherein the second region stores a second portion of the program, wherein the first and second portions are non-contigously stored in the nonvolatile memory;

d) storing a second page map entry corresponding to the second portion of the program in the virtual memory page map, wherein the second page map entry is contiguous to the first page map entry such that the first and second portions of the program are sequentially, contiguously mapped in the virtual memory page map; and e) executing the first and second portions of the program.

17. The method of claim 16 wherein each of the first and second regions corresponds to a block of nonvolatile memory.

18. The method of claim 16 wherein the first and second regions are directly mapped into the system memory address space.

19. The method of claim 16 wherein the first and subsequently needed regions are not directly mapped into the system memory address space, wherein addresses associated with the paging windows are translated into physical addresses for accessing the first and second regions.

20. The method of claim 16 wherein the nonvolatile memory comprises flash memory.

21. The method of claim 16 further comprising the steps of:

f) receiving a virtual address;

g) generating a page fault if the virtual address corresponds to a virtual page of memory which does not have an associated region currently mapped into the paging windows of the system memory address space.

22. The method of claim 16 wherein the first and second portions of the program are not stored in sequence within the nonvolatile memory.

* * * * *